United States Patent
Ogle et al.

(10) Patent No.: US 8,967,263 B2
(45) Date of Patent: Mar. 3, 2015

(54) METHODS OF TREATING A SUBTERRANEAN FORMATION WITH STRESS-ACTIVATED RESINS

(71) Applicant: Halliburton Energy Services, Inc., Houston, TX (US)

(72) Inventors: James William Ogle, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 200 days.

(21) Appl. No.: 13/621,952

(22) Filed: Sep. 18, 2012

(65) Prior Publication Data

US 2014/0076559 A1 Mar. 20, 2014

(51) Int. Cl.
E21B 43/267 (2006.01)
C09K 8/80 (2006.01)

(52) U.S. Cl.
CPC .............. *E21B 43/267* (2013.01); *C09K 8/805* (2013.01)
USPC ................... 166/308.1; 166/308.5; 166/280.1

(58) Field of Classification Search
CPC ......... E21B 43/267; C09K 8/805; C09K 8/68
USPC ............ 166/250.14, 259, 271, 280, 266, 300, 166/308.1, 308.5, 308.2, 280.2
See application file for complete search history.

(56) References Cited

U.S. PATENT DOCUMENTS

| | | | |
|---|---|---|---|
| 4,192,753 A * | 3/1980 | Pye et al. ...................... | 507/103 |
| 4,898,750 A * | 2/1990 | Friedman et al. ............. | 427/221 |
| 5,232,961 A * | 8/1993 | Murphey et al. .............. | 523/414 |
| 5,905,061 A | 5/1999 | Patel | |
| 5,977,031 A | 11/1999 | Patel | |
| 6,311,773 B1 | 11/2001 | Todd et al. | |
| 6,828,279 B2 | 12/2004 | Patel et al. | |
| 7,534,745 B2 | 5/2009 | Taylor et al. | |
| 7,645,723 B2 | 1/2010 | Kirsner et al. | |
| 7,696,131 B2 | 4/2010 | Oyler et al. | |
| 2002/0125012 A1 | 9/2002 | Dawson et al. | |
| 2004/0067544 A1 | 4/2004 | Vogel et al. | |
| 2005/0000764 A1 | 1/2005 | Kawai et al. | |
| 2006/0240994 A1 | 10/2006 | Eoff et al. | |
| 2007/0021533 A1 | 1/2007 | Yan et al. | |
| 2007/0169932 A1 | 7/2007 | Lindvig et al. | |
| 2008/0006405 A1 * | 1/2008 | Rickman et al. .............. | 166/295 |
| 2008/0039347 A1 | 2/2008 | Welton et al. | |
| 2008/0202750 A1 * | 8/2008 | Rediger et al. ............. | 166/280.2 |
| 2009/0048126 A1 | 2/2009 | Phatak et al. | |
| 2009/0176667 A1 | 7/2009 | Nguyen | |
| 2009/0203554 A1 | 8/2009 | Monroe et al. | |
| 2011/0278003 A1 * | 11/2011 | Rediger ..................... | 166/280.1 |
| 2012/0006535 A1 | 1/2012 | Alsop et al. | |
| 2012/0065350 A1 | 3/2012 | Habu et al. | |
| 2012/0077887 A1 | 3/2012 | Bowman et al. | |
| 2012/0086892 A1 | 4/2012 | Kim et al. | |
| 2012/0181027 A1 | 7/2012 | Welton et al. | |

FOREIGN PATENT DOCUMENTS

WO 2014046937 A1 3/2014

OTHER PUBLICATIONS

International Search Report and Written Opinion for PCT/US2013/059228 dated Nov. 22, 2013.
Lenhardt, J.M.; Ogle, J.W.; Ong, M.T.; Choe, R.; Martinez, T.J.; Craig, S.L., Reactive Cross-Talk between Adjacent Tension Trapped Tensions States, J. Am. Chem. Soc. 2011, 133, 3222-3225.
Black Rameriz, A.L.; Ogle, J.W.; Schmitt, A.L.; Lenhardt, J.M.; Cashion, M.P.; Manhanthappa, M.K.; Craig, S.L., Microstructure of Copolymers Formed by the Reagentless, Mechanochemical Remodeling of Holopolymers via Pulsed Ultrasound, Macro Letters 2012, 1, 23-27.
Lenhardt, J.M.; Black, A.L.; Craig, S.L., gem-Dichlorocyclopropanes as Abundant and Efficient Mechanophores in Polybutadiene Copolymers under Mechanical Stress, J. Am. Chem. Soc. 2009, 131, 10818-10819.

* cited by examiner

Primary Examiner — Zakiya W Bates
Assistant Examiner — Silvana Runyan
(74) Attorney, Agent, or Firm — McDermott Will & Emery LLP; Craig W. Roddy

(57) ABSTRACT

Methods of treating a subterranean formation including introducing a fracturing fluid into the subterranean formation at a pressure sufficient to create or enhance at least one fracture therein; a treatment fluid comprising a base fluid, proppant particulates, a crosslinking agent, and a stress-activated resin comprising a stress-activated moiety, wherein the stress-activated resin does not substantially react with the crosslinking agent until placed under stress; introducing the treatment fluid into the at least one fracture of the subterranean formation; removing the pressure in the subterranean formation such that the fracture closes on the treatment fluid and applies a stress to the stress-activated resin; and crosslinking the resin with the crosslinking agent, thereby forming a resinous proppant pack therein.

8 Claims, No Drawings

METHODS OF TREATING A SUBTERRANEAN FORMATION WITH STRESS-ACTIVATED RESINS

BACKGROUND

The present invention relates to methods of treating a subterranean formation with stress-activated resins.

Various methods are known for fracturing a subterranean formation to enhance the production of fluids. In a hydraulic fracturing operation, a pressurized fracturing fluid can be used to hydraulically create and propagate a fracture within the formation. Fracturing fluids can also carry and deposit solids, such as proppants particulates, into the fracture. Inside the fracture, the proppant particulates can form a tightly packed permeable mass (sometimes referred to as a "proppant pack"). The proppant pack serves as a physical barrier that prevents the fracture from fully closing and as a conduit through which production fluids can flow. The degree of success of a fracturing operation depends, at least in part, upon the fracture conductivity once the fracturing operation is stopped and production is begun. The conductivity of these proppant packs are somewhat limited because of the relatively small interconnected interstitial spaces between the packed proppant.

In order to ensure that a well-formed, porous proppant pack is created within a fracture, resins are often pre-coated onto the proppant particulates or included in fracturing treatment fluids to coat the proppant particulates downhole. Ideally, the resin is generally capable of preventing proppant particulate migration out of the formation and thus promotes the consolidation of proppant particulates to one another to form a proppant pack. The resin may act to improve the clustering capacity, tensile strength, and flowback control ability of the proppant pack. Resins may additionally promote homogeneous distribution of the proppant particulates within the proppant pack by reducing or preventing any tendency of them to flow out of the proppant pack within the fracture in the subterranean formation. Resins may be particularly useful if the proppant particulates used in a particular fracturing operation have a low density or specific gravity.

Traditional resins are "activated" (e.g., destabilized, coalesced and/or reacted) to transform into a sticky or tackifying compound by temperature alone. As used herein, the term "tacky," in all of its forms, generally refers to a substance having a nature such that it is somewhat sticky to the touch. Traditional resins are activated by a complex system of several chemicals, some of which are highly toxic, which must be used onsite during fracturing operations. Activation requires intergrain contact of proppant particulates, as well as a sufficiently high subterranean formation temperature. As such, activation may occur in undesirable portions of a subterranean formation (e.g., outside of a fracture) or not at all, resulting in either the absence of a formed proppant pack or an inefficient proppant pack. Moreover, traditional resins flow freely between proppant particulate grains and often result in a dumbbell or other undesirable shape when set up on the proppant particulates that further reduces the interstitial spaces within a proppant pack. Therefore, a single-step resin system that is not temperature dependent and capable of setting up on proppant particulates in desired portions of a subterranean formation (e.g., in a fracture) to produce a porous proppant pack may be desirable to one of ordinary skill in the art.

SUMMARY OF THE INVENTION

The present invention relates to methods of treating a subterranean formation with stress-activated resins.

In some embodiments, the present invention provides a method of treating a subterranean formation comprising: introducing a fracturing fluid into the subterranean formation at a pressure sufficient to create or enhance at least one fracture therein; providing a treatment fluid comprising a base fluid, proppant particulates, a crosslinking agent, and a stress-activated resin comprising a stress-activated moiety, wherein the stress-activated resin does not substantially react with the crosslinking agent until placed under stress; introducing the treatment fluid into the at least one fracture of the subterranean formation; removing the pressure in the subterranean formation such that the fracture closes on the treatment fluid and applies a stress to the stress-activated resin; and crosslinking the resin with the crosslinking agent, thereby forming a resinous proppant pack therein.

In other embodiments, the present invention provides a method of treating a subterranean formation comprising: introducing a fracturing fluid into the subterranean formation at a pressure sufficient to create or enhance at least one fracture therein; providing a treatment fluid comprising a base fluid, proppant particulates, a crosslinking agent encapsulated in a encapsulating material, and a stress-activated resin comprising a stress-activated moiety, wherein the stress-activated resin does not substantially react with the crosslinking agent until placed under stress; introducing the treatment fluid into the at least one fracture of the subterranean formation; removing the pressure in the subterranean formation such that the fracture closes on the treatment fluid and applies a stress to the stress-activated resin and the encapsulated crosslinking agent so as to activate the stress-activated resin; releasing the encapsulated crosslinking agent; and crosslinking the resin with the crosslinking agent, thereby forming a resinous proppant pack therein.

In still other embodiments, the present invention provides a method of treating a subterranean formation comprising:
introducing a fracturing fluid comprising a base fluid into the subterranean formation at a pressure sufficient to create or enhance at least one fracture therein;
providing a treatment fluid comprising a base fluid, proppant particulates, a crosslinking agent, and an encapsulated stress-activated resin, wherein the stress-activated resin comprises a stress-activated moiety and wherein the stress-activated resin does not substantially react with the crosslinking agent until placed under stress; introducing the treatment fluid into the at least one fracture of the subterranean formation; removing the pressure in the subterranean formation such that the at least one fracture closes on the treatment fluid and applies a stress or a stress to the encapsulated stress-activated resin so as to activate the stress-activated resin; releasing the encapsulated stress-activated resin; and crosslinking the resin with the crosslinking agent, thereby forming a resinous proppant pack therein.

The features and advantages of the present invention will be readily apparent to those skilled in the art upon a reading of the description of the preferred embodiments that follows.

DETAILED DESCRIPTION

The present invention relates to methods of treating a subterranean formation with stress-activated resins.

Traditional resins for use in downhole applications are solely temperature activated. Natural variations in a subterranean formation and the conditions in which the resins are prepared onsite may often result in undesirable curing of the resin, either before or after introducing it downhole. For example, localized hot zones in a formation may cause activation in undesirable areas (e.g., outside of a fracture) or cause undesirable agglomeration of the proppant particulates and traditionally cool formations or localized cool zones may prevent activation partially or completely. Additionally, onsite use of toxic chemicals to prepare the resin may result in premature activation in hot ambient temperatures prior to introducing the resin downhole or result in undesirable cured shapes (e.g., blotches) if the mixture is not adequately homogeneous.

The present invention provides methods for treating a subterranean formation with a resin that activates on stress and is not temperature dependent alone. As used herein, the term "stress" refers to compressive stress, tensile stress, shear stress, and any other type of physical stress that may be encountered in a subterranean formation. It should be noted that in some embodiments, the activation of the stress-activated resins by a stress may be synergistically enhanced with temperature fluctuations (e.g., applying a stress and heat to the stress-activated resin may have a synergistic effect to more readily or more effectively activate the resin). In one or more embodiments, the methods of the present invention may be more economical and/or less time consuming as compared with the use of traditional resins. The stress-activated resins of the present invention are used "on-the-fly" (e.g., at the wellhead during fracturing operations). However, with the benefit of this disclosure, it will be recognized by one of ordinary skill in the art that the stress-activated resins of the present invention may be pre-coated onto proppant particulates prior to introducing the proppant particulates downhole.

In one embodiment, the present invention provides a method of treating a subterranean formation comprising first introducing a fracturing fluid into the subterranean formation at a pressure sufficient to create or enhance at least one fracture therein. Next, a treatment fluid is placed into the fracture while the fracture is open. The treatment fluid comprises a base fluid, proppant particulates, a crosslinking agent, and a stress-activated resin comprising a stress-activated moiety. Wherein the stress-activated resin does not substantially react with the crosslinking agent until placed under stress. Once the treatment fluid is placed, the pressure on the subterranean formation is removed such that the fracture closes on the treatment fluid and applies a stress to the stress-activated resin. The stress of the fracture's closure causes at least a portion of the stress-activated resin to crosslink with the crosslinking agent, thereby forming a resinous proppant pack therein.

I. Stress-Activated Resin

The stress-activated resins of the present invention comprise a stress-activated moiety and are inert (e.g., do not become activated) until contacted with a suitable crosslinking agent in the presence of stress. In the presence of stress, the stress-activated moiety undergoes a physical conformation (e.g., molecular ring-opening), causing the stress-activated resin to become highly susceptible to attack (i.e., chemical binding compatibility) by the crosslinking agent. Upon binding of the conformationally changed stress-activated resin and the crosslinking agent, the resin is activated and cures into a tacky compound, thereby facilitating the formation of a proppant pack. As used herein, the term "conformation change" refers to the ability of the chemical structure of the stress-activated resin to alter (such as ring-opening) in the case of stress.

Any polymer or copolymer suitable for use in a subterranean formation and capable of accepting a stress-activated moiety is appropriate as the stress-activated resin of the present invention. Suitable stress-activated resins may include, but are not limited to, polybutadiene polymers, polybutadiene derivative polymers; spiropyran polymers; spiropyran derivative polymers, poly(allyl halide) polymers, poly(allyl halide) derivative polymers, epoxide polymers, epoxide derivative polymers, amine polymers, amine derivative polymers, polycyclic polymers, polycyclic halide containing polymers, polymers with Diels-Alder adducts along the backbones, copolymers thereof, including brush and graft copolymers, any derivative thereof, and any combination thereof. In some embodiments, the stress-activated resins are typically included in the methods of the present invention in an amount from about 0.1% to about 4% by weight of the proppant particulates. In preferred embodiments, the stress-activated resins are included in an amount from about 0.5% to about 3% by weight of the proppant particulates.

The stress-activated resins comprise a stress-activated moiety that may be any suitable moiety capable of undergoing a conformational change upon encountering stress. Suitable stress-activated moieties include, but are not limited to cycloalkenes, cycloalkanes, any derivative thereof, and any combination thereof. Preferred derivatives for use in the present invention include, but are not limited to, halide derivatives, ester derivatives, and sulfonate derivatives. Suitable cycloalkenes include, but are not limited to cyclopropenes, cyclobutenes (e.g., benzocyclobutene), cyclopentenes, cyclohexenes, cycloheptenes, 1,3-cyclohexadienes, 1,4 cyclohexadienes, 1,5-cyclooctadienes, any derivative thereof, and any combination thereof. Suitable cycloalkanes include, but are not limited to, cyclopropanes (e.g., dihalocyclopropane, dichlorocyclopropane, difluorocyclopropane, cyclopropyl dihalide), cyclobutane, cyclopentane, cyclohexane, cycloheptane, any derivative thereof, and any combination thereof.

In some embodiments, an optional silane coupling agent may be used to, among other things, act as a mediator to help bond the stress-activated resin to proppant particulates. Examples of suitable silane coupling agents include, but are not limited to, N-2-(aminoethyl)-3-aminopropyltrimethoxysilane, and 3-glycidoxypropyltrimethoxysilane, and combinations thereof. The silane coupling agent may be included in the treatment fluids according to the chemistry of the particular group as determined by one skilled in the art with the benefit of this disclosure. In some embodiments of the present invention, the silane coupling agent used is included in the treatment fluids in the range of about 0.1% to about 3% by weight of the treatment fluid.

Any surfactant compatible with the components of the treatment fluids of the present invention and capable of facilitating the coating of the stress-activated resin onto the proppant particulates in the subterranean formation may be used in the treatment fluids. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Combinations of one or more cationic and nonionic surfactants also may be suitable. Examples of such surfactant combinations are described in U.S. Pat. No. 6,311,773, the entire disclosure of which is incorporated herein by reference. The surfactant or surfactants that may be used are included in the treatment fluids in an amount in the range of about 1% to about 10% by weight of the treatment fluid.

II. Crosslinking Agent

The crosslinking agents suitable use in the present invention include, but are not limited to, aldehydes, dialdehydes (e.g., glutaraldehyde, hemiacetals, or aldehyde releasing compounds), diacid halides, dihalides (e.g., dichlorides and dibromides), polyacid anhydrides, epoxides, diepoxides, furfuraldehyde, aldehyde condensates, silyl-modified polyamide compounds, carboxylate metal salts, sulfate metal salts, and the like, any derivates thereof, and any combination thereof. In some embodiments of the present invention, the crosslinking agent may be present in the treatment fluids in an amount of about 0.01% to about 50% by weight of the stress-activated moiety to effect formation of the reaction product. In other embodiments, the crosslinking agent is present in an amount of about 0.5% to about 1% by weight of the stress-activated moiety.

III. Encapsulating Material

In some embodiments, the present invention provides a method of treating a subterranean formation comprising first introducing a fracturing fluid into the subterranean formation at a pressure sufficient to create or enhance at least one fracture therein. Then a treatment fluid is placed into the open fracture. The treatment fluid itself comprises a base fluid, proppant particulates, a crosslinking agent encapsulated in a encapsulating material, and a stress-activated resin comprising a stress-activated moiety, wherein the stress-activated resin does not substantially react with the crosslinking agent until placed under stress. Once the treatment fluid is placed into the fracture, the pressure on the formation is released such that the fracture closes. Closing the fracture applies a stress to the stress-activated resin. Then, the activated resin will crosslink as the encapsulated crosslinking agent is released from encapsulation, thereby forming a resinous proppant pack therein.

In other embodiments, the present invention provides a method of treating a subterranean formation comprising first introducing a fracturing fluid into the subterranean formation at a pressure sufficient to create or enhance at least one fracture therein. Then a treatment fluid is placed into the open fracture. The treatment fluid itself comprises a base fluid, proppant particulates, a crosslinking agent, and an encapsulated stress-activated resin, wherein the stress-activated resin comprises a stress-activated moiety and wherein the stress-activated resin does not substantially react with the crosslinking agent until placed under stress. Once the treatment fluid is placed into the fracture, the pressure on the formation is released such that the fracture closes. Closing the fracture applies a stress to the stress-activated resin. Then, the activated resin will crosslink as the encapsulated, now activated, resin is released from encapsulation, thereby forming a resinous proppant pack therein.

In some embodiments, both the crosslinking agent and the stress-activated resin may be encapsulated.

The encapsulation of the crosslinking agent and/or stress-activated resin may be designed to breakdown or degrade in response to, for example, time or subterranean conditions, such as temperature or pressure or exposure to aqueous or oleaginous fluids. The crosslinking agents and/or stress-activated resins of the present invention may be encapsulated by any known material capable of breaking down under known conditions provided that it does not contain components that might adversely affect the stability and/or performance of the treatment fluid. Suitable encapsulating materials include, but are not limited to, waxes, drying oils such as tung oil and linseed oil, polyurethanes, a crosslinked partially hydrolyzed polyacrylic, and any combinations thereof. Preferred encapsulating materials include silicate materials, glass materials, inorganic durable materials (e.g., aluminates, calcites), stiff polymer coatings with high melting temperatures, and any combination thereof. One skilled in the art will recognize that choice of a fragile encapsulating material that breaks under stress (such as fracture closure pressure) will allow for the encapsulated material to be released along with the activation of the resin.

Encapsulating materials may be applied to the crosslinking agents and/or stress-activated resins by any known method suitable for the encapsulating material used, such as spray coating, for example. In some embodiments, the encapsulated crosslinking agent and the encapsulated stress-activated resin are each from about 10 µm to about 400 µm in diameter. In preferred embodiments, the encapsulated crosslinking agent and the encapsulated stress-activated resin are each from about 50 µm to about 200 µm in diameter. The concentration of encapsulating material for use in the present invention is any amount sufficient to form an encapsulant thickness of about 1 µm to about 10 µm on the crosslinking agent and/or stress-activated resin.

IV. Base Fluids

Any treatment fluid suitable for use in a subterranean operation (e.g., fracturing or frac-packing) may be used in the fracturing fluid and/or treatment fluids of the present invention. The base fluid used in the fracturing fluid and treatment fluids of the present invention may be identical or vary in composition depending on the particular application. Suitable base fluids for use in conjunction with the present invention may include, but not limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. Nos. 5,905,061, 5,977,031, 6,828,279, 7,534,745, 7,645,723, and 7,696,131, each of which are hereby incorporated in their entirety by reference. It should be noted that for water-in-oil and oil-in-water emulsions, any mixture of the above may be used including the water being and/or comprising an aqueous-miscible fluid.

In some embodiments, the fracturing fluid and/or the treatment fluid of the present invention may be foamed depending on the particular application. Foams can be created by the addition of a gas, such as carbon dioxide or nitrogen. In other embodiments, the fracturing fluid and/or the treatment fluid of the present invention may be viscosified. Increasing the viscosity of the fracturing fluid and/or the treatment fluid may reduce fluid loss and facilitate transport of suspended proppant particulates. The fracturing fluid and/or the treatment fluid may be viscosified using a suitable gelling agent or other additive, such as those described in U.S. Patent App. 2012/0181027 and 2009/0176667, the entire disclosures of which are incorporated herein by reference. The treatment fluids may also include one or more of a variety of well-known additives, such as gel stabilizers, fluid loss control additives, clay stabilizers, bactericides, and the like.

V. Proppant Particulates

Proppant particulates suitable for use in the present invention may comprise any material suitable for use in subterranean operations. Suitable materials include, but are not limited to, cutting sand, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, solids-free or solids-laden gel bodies as described in U.S. patent application Ser. No. 13/429,660, the entire disclosure of which is incorporated herein by reference; and any combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combinations thereof. The mean proppant particulate size generally may range from about 2 mesh to about 800 mesh on the U.S. Sieve Series; however, in certain circumstances, other mean proppant particulate sizes may be desired and will be entirely suitable for practice of the present invention. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "proppant particulate," as used herein, includes all known shapes of materials, including substantially spherical materials, fibrous materials, polygonal materials (such as cubic materials), and any combinations thereof. In certain embodiments, the proppant particulates may be present in the fracturing fluids and/or the treatment fluids of the present invention in an amount in the range of from about 0.1 pounds per gallon ("ppg") to about 30 ppg by volume therein, preferably from about 0.5 ppg to about 15 ppg, and more preferably from about 1.0 ppg to 10 ppg.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a subterranean formation comprising:
    introducing a fracturing fluid into the subterranean formation at a pressure sufficient to create or enhance at least one fracture therein;
    providing a treatment fluid comprising a base fluid, proppant particulates, a crosslinking agent, and a stress-activated resin comprising a stress-activated moiety, wherein the stress-activated resin does not substantially react with the crosslinking agent until placed under stress where it undergoes a conformational change, and wherein the stress-activated resin is selected from the group consisting of a polybutadiene polymer, a polybutadiene derivative polymer; a spiropyran polymer; a spiropyran derivative polymer; a poly(allyl halide) polymer; a poly(allyl halide) derivative polymer; a polycyclic halide containing polymer; a copolymer thereof; a cyclopropene; a cyclobutene; a 1,3-cyclohexadiene; a 1,4 cyclohexadiene; a 1,5-cyclooctadiene; a cyclopropane; a cyclobutane; a cycloheptane; any derivative thereof; and any combination thereof;
    introducing the treatment fluid into the at least one fracture of the subterranean formation;
    removing the pressure in the subterranean formation such that the fracture closes on the treatment fluid and applies a stress to the stress-activated resin; and
    crosslinking the resin with the crosslinking agent, thereby forming a resinous proppant pack therein.

2. The method of claim 1, wherein the crosslinking agent is selected from the group consisting of an aldehyde; a dialdehyde; a diacid halide; a dihalide; a polyacid anhydride; an epoxide; a diepoxide; a furfuraldehyde; an aldehyde condensate; a silyl-modified polyamide; a carboxylate metal salt, a sulfate metal salt; any derivate thereof; and any combination thereof.

3. A method of treating a subterranean formation comprising:
    introducing a fracturing fluid into the subterranean formation at a pressure sufficient to create or enhance at least one fracture therein;
    providing a treatment fluid comprising a base fluid, proppant particulates, a crosslinking agent encapsulated in a encapsulating material, and a stress-activated resin comprising a stress-activated moiety, wherein the stress-activated resin does not substantially react with the crosslinking agent until placed under stress where it undergoes a conformational change, and wherein the stress-activated resin is selected from the group consisting of a polybutadiene polymer, a polybutadiene derivative polymer; a spiropyran polymer; a spiropyran derivative polymer; a poly(allyl halide) polymer; a poly(allyl halide) derivative polymer; an a polycyclic halide containing polymer; a copolymer thereof; a cyclopropene; a cyclobutene; a 1,3-cyclohexadiene; a 1,4cyclohexadiene; a 1,5-cyclooctadiene; a cyclopropane; a cyclobutane; a cycloheptane; any derivative thereof; and any combination thereof;

introducing the treatment fluid into the at least one fracture of the subterranean formation;

removing the pressure in the subterranean formation such that the fracture closes on the treatment fluid and applies a stress to the stress-activated resin so as to activate the stress-activated resin;

releasing the encapsulated crosslinking agent from the encapsulating material simultaneously with or after the pressure is removed; and crosslinking the resin with the crosslinking agent, thereby forming a resinous proppant pack therein.

4. The method of claim 3, wherein the crosslinking agent is selected from the group consisting of an aldehyde; a dialdehyde; a diacid halide; a dihalide; a polyacid anhydride; an epoxide; a diepoxide; a furfuraldehyde; an aldehyde condensate; a silyl-modified polyamide; a carboxylate metal salt, a sulfate metal salt; any derivate thereof; and any combination thereof.

5. The method of claim 3, wherein the encapsulated crosslinking agent is encapsulated in an encapsulating material that is selected from the group consisting of a wax; a drying oil; a polyurethane; a crosslinked partially hydrolyzed polyacrylic; a silicate material; a glass material; an inorganic durable material; a still polymer coating with high melting temperature; and any combination thereof.

6. A method of treating a subterranean formation comprising:

introducing a fracturing fluid comprising a base fluid into the subterranean formation at a pressure sufficient to create or enhance at least one fracture therein;

providing a treatment fluid comprising a base fluid, proppant particulates, a crosslinking agent, and an encapsulated stress-activated resin, wherein the stress-activated resin comprises a stress-activated moiety, wherein the stress-activated resin does not substantially react with the crosslinking agent until placed under stress where it undergoes a conformational change, and wherein the stress-activated resin is selected from the group consisting of a polybutadiene polymer, a polybutadiene derivative polymer; a spiropyran polymer; a spiropyran derivative polymer; a poly(allyl halide) polymer; a poly(allyl halide) derivative polymer; a polycyclic halide containing polymer; a copolymer thereof; a cyclopropene; a cyclobutene; a 1,3-cyclohexadiene; a 1,4 cyclohexadiene; a 1,5-cyclooctadiene; a cyclopropane; a cyclobutane; a cycloheptane; any derivative thereof; and any combination thereof;

introducing the treatment fluid into the at least one fracture of the subterranean formation;

removing the pressure in the subterranean formation such that the at least one fracture closes on the treatment fluid and applies a stress or a stress to the encapsulated stress-activated resin so as to activate the stress-activated resin;

releasing the encapsulated stress-activated resin; and crosslinking the resin with the crosslinking agent, thereby forming a resinous proppant pack therein.

7. The method of claim 6, wherein the crosslinking agent is selected from the group consisting of an aldehyde; a dialdehyde; a diacid halide; a dihalide; a polyacid anhydride; an epoxide; a diepoxide; a furfuraldehyde; an aldehyde condensate; a silyl-modified polyamide; a carboxylate metal salt, a sulfate metal salt; any derivate thereof; and any combination thereof.

8. The method of claim 6, wherein the encapsulated stress-activated resin is encapsulated in an encapsulating material that is selected from the group consisting of a wax; a drying oil; a polyurethane; a crosslinked partially hydrolyzed polyacrylic; a silicate material; a glass material; an inorganic durable material; a still polymer coating with high melting temperature; and any combination thereof.

* * * * *